United States Patent
Von Hoyningen-Huene et al.

(10) Patent No.: US 11,916,737 B2
(45) Date of Patent: Feb. 27, 2024

(54) METHOD AND UNIT FOR OPERATING A TSN COMMUNICATION SYSTEM

(71) Applicant: Robert Bosch GmbH, Stuttgart (DE)

(72) Inventors: Johannes Von Hoyningen-Huene, Kiel (DE); Ludwig Arnold Leurs, Lohr-Steinbach (DE); Mohamed Abdel Metaal, Bonn (DE); Rene Guillaume, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 260 days.

(21) Appl. No.: 17/419,473

(22) PCT Filed: Feb. 24, 2020

(86) PCT No.: PCT/EP2020/054763
§ 371 (c)(1),
(2) Date: Jun. 29, 2021

(87) PCT Pub. No.: WO2020/178057
PCT Pub. Date: Sep. 10, 2020

(65) Prior Publication Data
US 2022/0094599 A1   Mar. 24, 2022

(30) Foreign Application Priority Data
Mar. 6, 2019 (DE) .......................... 102019203001.7

(51) Int. Cl.
*H04L 41/0823* (2022.01)
*H04L 41/0806* (2022.01)
*H04L 47/28* (2022.01)

(52) U.S. Cl.
CPC ...... *H04L 41/0823* (2013.01); *H04L 41/0806* (2013.01); *H04L 47/28* (2013.01)

(58) Field of Classification Search
CPC .. H04L 47/28; H04L 41/0806; H04L 41/0823
See application file for complete search history.

(56) References Cited

U.S. PATENT DOCUMENTS

| 10,374,456 B2* | 8/2019 | MacCleery ............... H02J 3/40 |
| 2013/0064235 A1 | 3/2013 | Burra et al. |

(Continued)

FOREIGN PATENT DOCUMENTS

| CN | 102143500 A | 8/2011 |
| CN | 103081414 A | 5/2013 |

(Continued)

OTHER PUBLICATIONS

International Search Report for PCT/EP2020/054763, dated May 29, 2020.

(Continued)

*Primary Examiner* — Ajay Cattungal
(74) *Attorney, Agent, or Firm* — NORTON ROSE FULBRIGHT US LLP

(57) ABSTRACT

A method for operating a TSN communication system, which includes at least one TSN communication device, in particular a TSN switch. The method include: ascertaining operating parameters for at least one further communication device, which is designed to transfer first data via the TSN communication system, preferably for multiple further communication devices, which are designed to transfer data via the TSN communication system, the operating parameters being associated with at least one operating phase of the particular communication device or communication devices; ascertaining a schedule for the at least one TSN communication device; transferring the schedule to the at least one TSN communication device.

12 Claims, 3 Drawing Sheets

(56) References Cited

U.S. PATENT DOCUMENTS

| | | |
|---|---|---|
| 2018/0227067 A1 | 8/2018 | Hu et al. |
| 2021/0352607 A1* | 11/2021 | Miao ................. H04W 56/0045 |
| 2022/0030662 A1* | 1/2022 | Mueck ................. H04W 88/06 |
| 2022/0116252 A1* | 4/2022 | Xiong ................. H04L 27/2607 |

FOREIGN PATENT DOCUMENTS

| | | |
|---|---|---|
| CN | 108809707 A | 11/2018 |
| EP | 2490371 A1 | 8/2012 |
| WO | 2013155548 A1 | 10/2013 |
| WO | 2015092567 A1 | 6/2015 |
| WO | 2018113472 A1 | 6/2018 |
| WO | 2018203923 A1 | 11/2018 |

OTHER PUBLICATIONS

Pop et al., "Enabling Fog Computing for Industrial Automation Through Time- Sensitive Networking (TSN)," IEEE Communications Standards, vol. 2, No. 2, 2018, pp. 55-61.

Gutierrez et al., "Self-Configuration of IEEE 802.1 TSN Networks," 22nd IEEE International Conference on Emerging Technologies and Factory Automation (ETFA), IEEE, 2017, pp. 1-8.

802.1QBV-2015 IEEE Standar for Local and Metropolitan Area Networks—Bridges and Briged Networks—Amend 25, IEEE 25, 2015, pp. 1-57.

802.1Q-2018 IEEE Standard for Local and Metropolitan Area Networks—Bridges and Bridged Networks, 2018, pp. 1-1993.

* cited by examiner

METHOD AND UNIT FOR OPERATING A TSN COMMUNICATION SYSTEM

FIELD

The present invention relates to a method for operating a TSN communication system.

The present invention further relates to a unit for operating a TSN communication system.

BACKGROUND INFORMATION

In industrial manufacturing, data are exchanged, for example, between industrial controllers and various sensors and actuators. Cycle times of less than 1 millisecond (ms) are possible. Specialized Industrial Ethernet Protocols, such as Sercos III, EtherCAT and Profinet IRT, are used today. They permit very short latencies and cycle times, but are incompatible with Standard Ethernet.

SUMMARY

Enhancements of the Ethernet standard are in progress under the terms "Time-Sensitive Networking" (TSN), which also result in low-latency and reliable data streams. One important mechanism in TSN is the "time-aware shaper" (IEEE 802.1Qbv), with the aid of which cyclical time slots may be reserved in Ethernet devices such as terminals and switches. Time-critical data may then be transferred by the network in these time slots, these data not being impaired by further data streams within these time slots.

Preferred specific embodiments of the present invention relate to a method for operating a time-sensitive networking (TSN) communication system, which includes at least one TSN communication device, in particular a TSN switch.

According to further preferred specific embodiments, a time-sensitive networking, TSN, communication system is a communication system, which is based on the Ethernet IEEE-802.1Q-2018 standard (and/or on IEEE 802.1AS or IEEE 1588) and includes at least one component, in particular a switch ("TSN switch"), which is designed to operate according to the IEEE 802.1Qbv standard.

According to further preferred specific embodiments of the present invention, a time-sensitive networking, TSN, communication device is a communication device, which is based on the Ethernet standard and is designed to operate according to the IEEE 802.1Qbv standard. According to further specific embodiments, one example of a TSN communication device is a TSN switch, which is designed to operate according to the IEEE 802.1Qbv standard, in particular to reserve transfer resources such as cyclical time slots.

According to preferred specific embodiments of the present invention, the method includes the following steps: Ascertaining operating parameters for at least one further communication device, which is designed to transfer first data via the TSN communication system, preferably for multiple further communication devices, which are designed to transfer data via the TSN communication system, the operating parameters being associated with at least one operating phase of the particular communication device or communication devices; ascertaining a schedule for the at least one TSN communication device; transferring the schedule to the at least one TSN communication device. An efficient configuration of the at least one TSN communication device or the overall TSN communication system is made possible thereby.

In further preferred specific embodiments of the present invention, it is provided that the operating parameters include at least one data structure and/or a cycle time.

In further preferred specific embodiments of the present invention, it is provided that the at least one communication device has multiple different operating phases, individual operating parameters being assigned in each case to at least two of the multiple different operating phases, in particular the different operating phases including, for example, at least one of the following elements: identification phase, configuration phase, real-time operating phase.

In further preferred specific embodiments of the present invention, it is provided that the schedule at least temporarily establishes a) an exclusive use of transfer resources of the at least one TSN communication device and/or the TSN communication system for transferring the first data; and/or b) a prioritized (but not exclusive, e.g., competing) use of transfer resources of the at least one TSN communication device and/or the TSN communication system for transferring the first data.

In further preferred specific embodiments of the present invention, it is provided that the method also includes: Transferring the first data from the at least one further communication device via the TSN communication system. In this way, the first data may be efficiently transferred, in particular "tunneled," via the TSN communication system.

In further preferred specific embodiments of the present invention, it is provided that the first data include at least one data packet, the at least one further communication device marking the at least one data packet in such a way that it includes a reference to the schedule, which may be evaluated by the at least one TSN communication device. The transfer resources reserved in advance for the relevant data packet with the aid of the schedule may be efficiently used thereby for transferring this data packet.

Further preferred specific embodiments of the present invention relate to a unit for operating a TSN communication system, which includes at least one TSN communication device, in particular a TSN switch, the unit being designed to carry out the following steps: Ascertaining operating parameters for at least one further communication device, which is designed to transfer first data via the TSN communication system, preferably for multiple communication devices, which are designed to transfer data via the TSN communication system, the operating parameters being associated with at least one operating phase of the particular communication device or communication devices; ascertaining a schedule for the at least one TSN communication device; transferring the schedule to the at least one TSN communication device.

In further preferred specific embodiments of the present invention, it is provided that the unit is designed to carry out the method according to the specific embodiments.

In further preferred specific embodiments of the present invention, it is provided that the unit according to the specific embodiments or the functionality of the unit according to the specific embodiments is integrated into a control unit, e.g., into a controller for Industrial Ethernet applications.

Further preferred specific embodiments of the present invention relate to a TSN communication system, which includes at least one TSN communication device, in particular a TSN switch, at least one further communication device, which is designed to transfer first data via the TSN communication system, and a unit according to the specific embodiments.

Further preferred specific embodiments of the present invention relate to a use of the method according to the specific embodiments and/or the unit according to the specific embodiments for configuring a or the TSN communication system.

Further preferred specific embodiments of the present invention relate to a use of the method according to the specific embodiments and/or the unit according to the specific embodiments in a motor vehicle and/or in a piece of industrial manufacturing equipment.

The method according to the specific embodiments of the present invention may advantageously make it possible to take into account data structures, in particular Industrial Ethernet data structures, of different, in particular all, configuration phases in generating the TSN schedule. Furthermore, no further reconfiguration of the TSN devices is advantageously necessary between each change of operating phases or configuration phases, and no transfer resources need to be unnecessarily exclusively reserved in a real-time operation, which were needed, for example, only at the point in time of the startup.

The features according to the specific embodiments may be used in all areas in which, for example, deterministic, time-triggered communication methods are used, which may include different cycle times and/or data structures during operation, on the one hand, and which are to be migrated, for example, to an operation using TSN communication systems, on the other hand. Among other things, areas of this type are industrial manufacturing as well as networks within vehicles.

Additional features, application possibilities and advantages of the present invention are derived from the following description of exemplary embodiments of the present invention, which are illustrated in the figures. All features described or illustrated form the subject matter of the present invention alone or in any arbitrary combination, regardless of their wording in the description herein or illustration in the figures.

DETAILED DESCRIPTION OF EXAMPLE EMBODIMENTS

Figure 1:
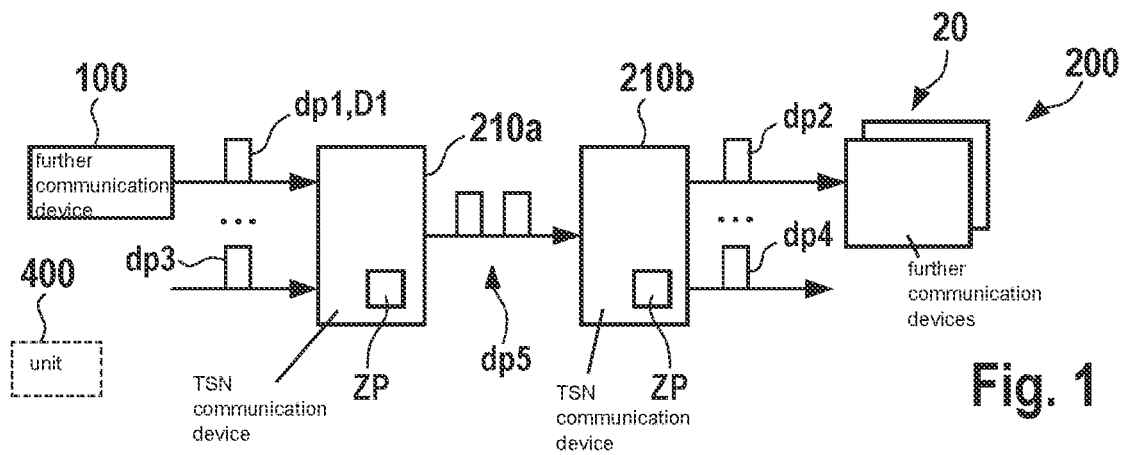
FIG. 1 schematically shows a block diagram of a communication system according to preferred specific embodiments of the present invention.

FIG. 1 schematically shows a block diagram of a communication system 200 according to preferred specific embodiments of the present invention. Communication system 200 is a time-sensitive networking (TSN) communication system 200, i.e. a communication system which is based on the Ethernet standard and includes at least one component, in particular a switch ("TSN switch"), which is designed to operate according to the IEEE 802.1Qbv standard.

In the present case, TSN communication system 200 includes two TSN communication devices 210a, 210b, each of which is, for example, a TSN switch, i.e. a TSN-capable network coupling element, which may connect multiple network segments and/or terminals or the like to each other.

As is shown in FIG. 1, in the present case a further communication device 100 is provided as an example, which may be, for example, an industrial control unit (e.g., of the Industrial Ethernet type), as used, for example, in industrial manufacturing equipment. Further communication device 100 transmits first data D1 to first TSN switch 210a, in particular in the form of corresponding data packets dp1. Further communication devices 20 are also apparent from FIG. 1, which may be, for example, terminals, such as actuators and/or sensors or the like (e.g., Industrial Ethernet terminals). In the present case, second TSN switch 210b transmits data packets dp2 to these terminals 20. Similarly, first TSN switch 210a may also receive further data packets dp3 from further components (not illustrated), and/or second TSN switch 210b may transmit further data packets dp4 to further components (which are also not illustrated). Data packets dp5 may also be exchanged between TSN switches 210a, 210b, which, in further preferred specific embodiments, at least partially contain, for example, the other aforementioned data packets dp1, dp2, dp3, dp4 or correspond thereto or are derived therefrom.

In further preferred specific embodiments of the present invention, at least some of the data packets may have a priority, which may control a processing, in particular forwarding, of the data packets, e.g., by TSN switches 210a, 210b, for example the processing (in particular transmission and/or mediation) of data packets having a higher priority being preferred over that of data packets having a lower priority. In further preferred specific embodiments, the priority according to the IEEE 802.1Q standard may be used.

Figure 3:
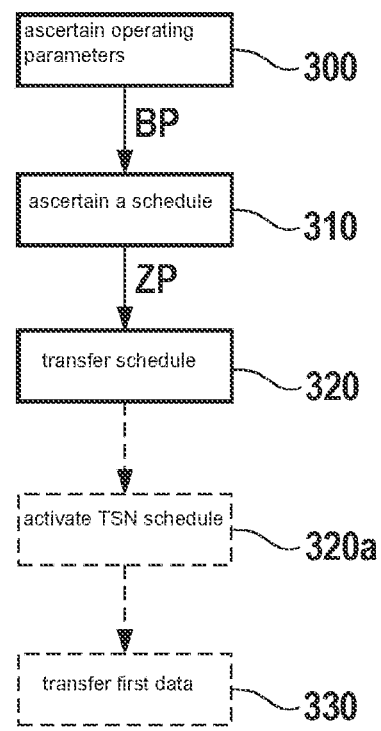
FIG. 3 schematically shows a simplified flowchart of a method according to further preferred specific embodiments of the present invention.

In further preferred specific embodiments of the present invention, the method described below with reference to the flowchart according to FIG. 3 is provided for the operation, in particular for a configuration, of TSN communication system 200. The method according to FIG. 3 may be carried out, for example, by optional unit 400 from FIG. 1, which or whose functionality may also be integrated, for example, into further communication device 100 in further preferred specific embodiments. The method includes the following steps: Ascertaining 300 (FIG. 3) operating parameters BP for at least one further communication device 20, 100 (FIG. 1), which is designed to transfer first data D1 via TSN communication system 200, preferably for multiple further communication devices 20, 100, which are designed to transfer data via TSN communication system 200, operating parameters BP being associated with at least one operating phase of particular communication device(s) 20, 100; ascertaining 310 (FIG. 3) a schedule ("TSN schedule") ZP for the at least one TSN communication device 210a, 210b; transferring 320 schedule ZP to the at least one TSN communication device 210a, 210b. An efficient configuration of the at least one TSN communication device 210a, 210b or overall TSN communication system 200 is made possible thereby, in particular the different requirements of communication device(s) 20, 100 with regard to a data transfer via components 200, 210a, 210b being able to be taken into account in the possibly different operating phases of particular communication device(s) 20, 100. In further preferred specific embodiments, an activation of TSN schedule ZP in one or multiple of aforementioned components 200, 210a, 210b may optionally take place in step 320a. Activation 320a may result in the fact that the relevant components operate according to schedule ZP from that point on, thus reserving transfer resources according to schedule ZP for data to be processed in the future, in particular data packets or data streams.

In further preferred specific embodiments of the present invention, it is provided that operating parameters BP (FIG. 3) include at least one data structure and/or a cycle time. The at least one data structure and/or a cycle time may be advantageously taken into account thereby when forming schedule ZP.

In further preferred specific embodiments of the present invention, it is provided that the at least one communication device 20, 100 has multiple different operating phases, individual operating parameters BP being assigned in each case to at least two of the multiple different operating phases.

In further preferred specific embodiments of the present invention, the different operating phases may include at least one of the following elements: identification phase, configuration phase, real-time operating phase. In this way, it is advantageously possible to take these different operating phases of communication devices 20, 100 into account during the ascertainment of TSN schedule ZP and thus the different requirements possibly associated with the different operating phases with respect to the data transfer via TSN communication system 200 (e.g., size of data packets, cycle time, real-time properties or a corresponding reservation of transfer resources).

In further specific embodiments of the present invention, it is provided that schedule ZP at least temporarily establishes a) an exclusive use of transfer resources of the at least one TSN communication device 210a, 210b and/or TSN communication system 200 for transferring first data D1; and/or b) a prioritized (but not exclusive, e.g., competing) use of transfer resources of the at least one TSN communication device 210a, 210b and/or TSN communication system 200 for transferring first data D1. The particular transfer resources of participating components 200, 210a, 210b may be efficiently defined and distributed thereby.

In further preferred specific embodiments of the present invention, it is provided that the method also includes, cf. FIG. 3: Transferring 330 first data D1 from the at least one further communication device 100 via TSN communication system 200, e.g., to terminal(s) 20. In this way, first data D1 may be efficiently transferred, in particular tunneled, via TSN communication system 200. For example, first data D1 may correspond to an Industrial Ethernet data stream, which is generated by communication device 100 and is transferred to terminal(s) 20 designed, for example, as Industrial Ethernet terminals, via TSN communication system 200. The provision of TSN schedule ZP according to the specific embodiments permits a particularly efficient tunneling of (Industrial Ethernet) data streams D1 of this type by TSN communication system 200.

In further specific embodiments of the present invention, it is provided that first data D1 include at least one data packet dp1 (FIG. 1), the at least one further communication device 100 (or unit 400) marking the at least one data packet dp1 in such a way that it includes a reference to schedule ZP which may be evaluated by the at least one TSN communication device 210a, 210b. The transfer resources reserved in advance for relevant data packet dp1 with the aid of schedule ZP may be efficiently used thereby for transferring this data packet.

Figure 2A:
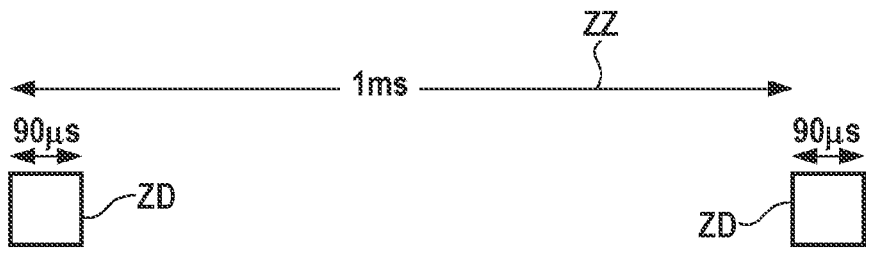
FIGS. 2A, 2B, 2C each schematically show a cycle structure of a communication according to further preferred specific embodiments of the present invention.

FIG. 2A schematically shows an example of a cycle time ZZ of 1 ms and transfer durations ZD of 90 microseconds (µs) each, corresponding to data structures, which are usable, for example, during a first configuration phase of communication devices 20, 100. Cycle time ZZ and transfer durations ZD form operating parameters BP within the meaning of the specific embodiments described above with reference to FIG. 3, these operating parameters being associated with the first configuration phase and possibly being incorporated into the ascertainment of schedule ZP, cf. step 310.

Figure 2B:
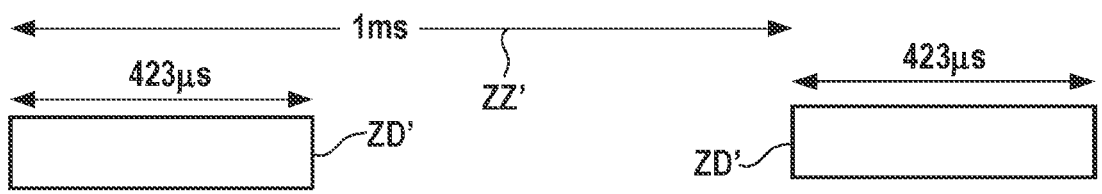

FIG. 2B schematically shows an example of a cycle time ZZ' of 1 ms and transfer durations ZD' of 423 µs each, corresponding to data structures, which are usable, for example, during a second configuration phase of communication devices 20, 100, the second configuration phase following, for example, the first configuration phase according to FIG. 2A. Cycle time ZZ' and transfer durations ZD' according to FIG. 2D form operating parameters BP within the meaning of the specific embodiments described above with reference to FIG. 3, these operating parameters being associated in the present case with the second configuration phase and possibly being incorporated into the ascertainment of schedule ZP, cf. step 310.

Figure 2C:
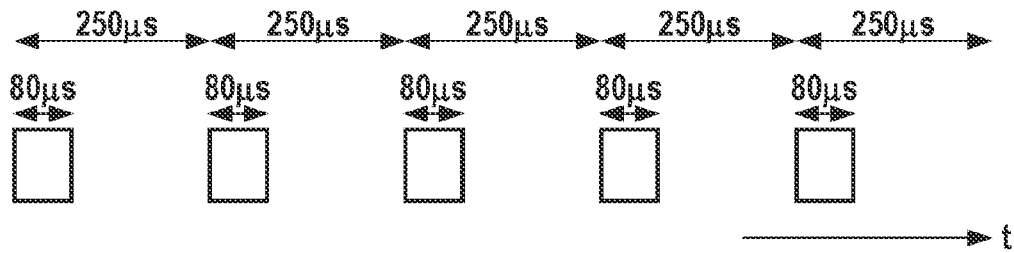

FIG. 2C schematically shows an example of a cycle time of 250 µs and transfer durations of, for example, 80 µs, which are not designated individually for the sake of clarity, corresponding to data structures, which may be used, for example, during a real-time operating phase of communication devices 20, 100.

Figure 4:
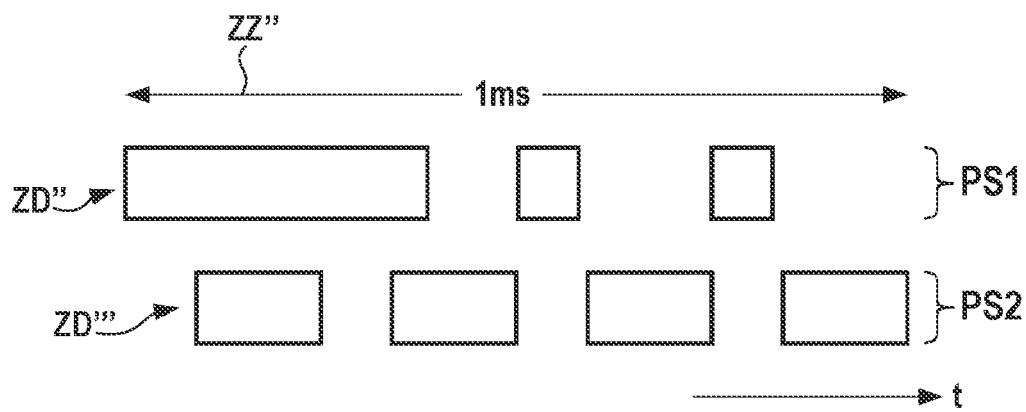
FIG. 4 schematically shows a schedule according to further preferred specific embodiments of the present invention.

FIG. 4 schematically shows an example of a cycle time ZZ" of 1 ms for a first priority level PS1 (for example, corresponding to a TSN priority of value "7" according to IEEE 802.1Qbv) and transfer durations ZD" of first priority level PS1, which are not designated individually for the sake of clarity, corresponding to data structures, which are usable, for example, during a real-time operating phase of communication devices 20, 100, the real-time operating phase following, for example, the second configuration phase according to FIG. 2B. FIG. 4 additionally schematically shows, for a second priority level PS2 (for example according to a TSN priority of values from "0" to "6" according to IEEE 802.1Q), transfer durations ZD'" of second priority level PS2, which are also not designated individually for the sake of clarity, corresponding to data structures, which are also usable, for example, during the real-time operating phase of communication devices 20, 100. Cycle time ZZ" and transfer durations ZD", ZD'" according to FIG. 4 form operating parameters BP within the meaning of the specific embodiments described above with reference to FIG. 3, these operating parameters being associated in the present case with the real-time operating phase and possibly being incorporated into the ascertainment of schedule ZP, cf. step 310.

Further preferred specific embodiments relate to a unit 400 (FIG. 1) for operating a or the TSN communication system 200, which includes at least one TSN communication device 210a, 210b, in particular a TSN switch. Unit 400 is advantageously designed to carry out the method according to the specific embodiments (cf. e.g. FIG. 3) and/or at least individual steps thereof. As already mentioned above, the functionality of unit 400 may also be integrated into further communication device 100 (and/or at least one of terminals 20) in further preferred specific embodiments.

Figure 5:
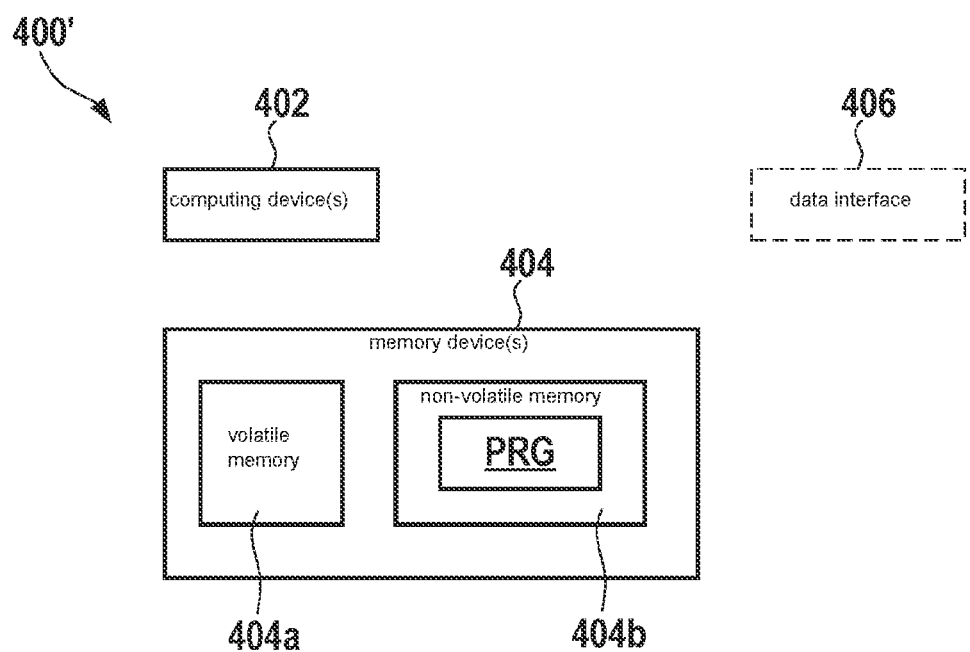
FIG. 5 schematically shows a simplified block diagram of a unit according to further preferred specific embodiments of the present invention.

FIG. 5 schematically shows a simplified block diagram of a unit 400' according to further preferred specific embodiments. For example, unit 400 from FIG. 1 may have configuration 400' according to FIG. 5. Unit 400' includes at least one computing device 402, at least one memory device 404 assigned to computing device 402 for at least buffering a computer program PRG, computer program PRG being designed, in particular, to control an operation of unit 400' and/or to carry out the method according to the specific embodiments.

In further preferred specific embodiments, computing device 402 includes at least one of the following elements: a microprocessor, a microcontroller, a digital signal processor (DSP), a programmable logic unit (e.g., FPGA, field programmable gate array), an ASIC (application-specific integrated circuit), a hardware circuit. Combinations thereof are also possible in further preferred specific embodiments.

In further specific embodiments, memory device 404 includes at least one of the following elements: a volatile memory 404a, in particular a random-access memory (RAM), a non-volatile memory 404b, in particular a flash EEPROM. Computer program PRG is preferably stored in non-volatile memory 404b. Unit 400' optionally includes a data interface 406 for transferring data, in particular data packets dp1, via TSN communication system 200. In further specific embodiments, for example TSN schedules ZP may be transferred to further communication devices 210a, 210b via this data interface 406.

Further preferred specific embodiments relate to a TSN communication system 200 (FIG. 1), which includes at least one TSN communication device 210a, 210b, in particular a TSN switch, at least one further communication device 100, e.g., an (Industrial Ethernet) control unit, which is designed to transfer first data D1 via TSN communication system 200, and a unit 400 according to the specific embodiments.

Further preferred specific embodiments relate to a use of the method according to the specific embodiments and/or unit 400 according to the specific embodiments for configuring a or the TSN communication system 200.

Further preferred specific embodiments relate to a use of the method according to the specific embodiments and/or unit 400 according to the specific embodiments in a motor vehicle and/or in a piece of industrial manufacturing equipment.

Due to a transfer, in particular tunneling, of data packets dp1, in particular the (Industrial) Ethernet packets, by TSN network 200 according to the specific embodiments, a coexistence of (Industrial) Ethernet devices 100, 20 with TSN communication systems 200 is advantageously efficient to implement.

The method according to the specific embodiments advantageously makes it possible to take into account data structures, in particular Industrial Ethernet data structures of different, in particular all, configuration phases in generating TSN schedule ZP. Furthermore, no further reconfiguration of TSN devices 210a, 210b is advantageously necessary between each change of operating phases or configuration phases of components 20, 100, and, in further preferred specific embodiments, no transfer resources need to be unnecessarily exclusively reserved in a real-time operation, which were needed, for example, only at the point in time of the startup of components 20, 100.

The principle according to the specific embodiments may be used in all areas in which, for example, deterministic, time-triggered communication methods are used, which may include different cycle times and/or data structures during operation, on the one hand, and which are to be migrated, for example, to an operation using TSN communication systems 200, on the other hand. Areas of this type are, among other things, industrial manufacturing as well as networks within vehicles, in particular motor vehicles. The principle according to the specific embodiments may permit an efficient tunneling of (Industrial) Ethernet data packets dp1 by a TSN network, it being possible to advantageously meet the particular requirements of the Ethernet standard (e.g., Sercos III, EtherCAT, Profinet IRT). In particular, the generally high (latency) requirements of Industrial Ethernet protocols may be met by the method according to the specific embodiments.

In further preferred specific embodiments, for example a "cut-through" method may be used instead of a "store-and-forward" method in TSN switches 210a, 210b, in which an Ethernet packet is already forwarded via another port of the switch before it has been completely received at a receive point of the same switch. The delay in forwarding the packet is very short in this case and is independent of the packet size, unlike the store-and-forward approach. Of course, this rapid forwarding requires the outgoing port to be free and not simultaneously transmitting other packets having a lower priority, which may be advantageously ensured by using schedule ZP according to the present invention.

In further advantageous specific embodiments, further communication device 100, which may be, for example, an industrial controller 100 or a control unit of a motor vehicle, is already programmed in advance ("offline"). This means that it is known in advance
 a. with which further devices 20 (sensors, actuators, drives, etc.) data is to be exchanged via TSN system 200 (which further devices 20 are thus to be, for example, part of a distributed application); and/or
 b. which cycle times are provided for the particular data transfer; and/or
 c. how many pieces of data are to be exchanged (data quantity); and/or
 d. which settings are to be transferred to devices 20. These aspects advantageously form an a priori knowledge.

In further specific embodiments, controller 100 may ascertain the necessary data structures of the (Industrial) Ethernet, in particular using the aforementioned a priori knowledge, in particular in all necessary configuration steps, e.g., by an identification (cf. e.g. FIG. 2A) of devices 20 via their configuration (cf. e.g. FIG. 2B) and the real-time operation (cf. e.g. FIGS. 2C, 4), and/or the particular cycle times. They form, in particular together, described operating parameters BP (FIG. 3). In further specific embodiments, the particular data structure in real-time operation may be very individually and highly optimized, usually for every application, while the data structures in the preceding configuration phases are usually predefined by a protocol.

In further preferred specific embodiments, controller 100 may change the cycle time and/or the data structure, in particular, even during a communication with (Industrial Ethernet) devices 20 via TSN network 200, without this having to be explicitly communicated to TSN devices 210a, 210b.

In further preferred specific embodiments, a possible overlapping with further network traffic may occur during a configuration phase, e.g., of an Industrial Ethernet protocol. The higher priority of Industrial Ethernet packets dp1 may be taken into account as a priority in further preferred specific embodiments. In further preferred specific embodiments, a schedule ZP of TSN switch 210a, 210b is selected in such a way that the ports (connections) of switch 210a, 210b are blocked for Ethernet packets having other priorities before the start of each Industrial Ethernet cycle. This ensures that the first Ethernet packets of each Industrial Ethernet cycle are passed through without delay. In further preferred specific embodiments, this may be important, in particular in the case of the "Sercos III" protocol, since terminals 20, 100 including this first packet of a cycle are synchronized to the time of the master.

Afterwards, in a time interval, in which packets of multiple priorities may be transmitted, it is theoretically and very rarely possible in further specific embodiments that a short packet of another priority is inserted between two tunneled Industrial Ethernet packets, and the subsequent Industrial Ethernet packets may thus be delayed thereby. However, this is usually tolerable in the case of minor delays and at least in the configuration phase.

In further preferred specific embodiments, TSN schedule ZP is preferably selected for a real-time operating phase in such a way that collisions with further, in particular non-time-critical, data packets are ruled out. Latency and jitter in the tunneling of data packets dp1 by TSN network 200 are minimal in this case. All communication resources which are not exclusively reserved for these Industrial Ethernet data are fully available for other services (and/or devices), e.g., as a function of TSN schedule ZP, since they are not needed by the Industrial Ethernet system during real-time operation.

In further preferred specific embodiments, the Industrial Ethernet system (e.g., including devices 20, 100) may be arbitrarily restarted without notifying TSN devices 210a, 210b, as long as data structures needed for the Industrial Ethernet system are the same as before the definition of TSN schedule ZP.

In further preferred specific embodiments, if it may be predicted that no Industrial Ethernet data (or data packets dp1 between components 100, 20) need to be exchanged for a longer period of time, because, e.g., corresponding components 100, 20 have been switched off, it is possible to communicate this to TSN devices 210a, 210b, e.g., by units 400, 400', so that TSN devices 210a, 210b may release the reserved time windows, possibly by modifying TSN schedule ZP. A restart of components 20, 100 may take place, e.g., by again carrying out step sequence 300, 310, 320 according to FIG. 3.

The features according to the specific embodiments may advantageously permit an efficient tunneling, in particular of time-critical data D1, by TSN network 200. Ethernet-capable equipment, such as Industrial Ethernet devices 20, 100, may also (continue) to be used in a TSN environment.

In addition, the calculation of a TSN schedule may be extremely complex in conventional approaches, so that the calculation of multiple schedules of this type may result in high utilization of the available resources, a high energy consumption and a long calculation time. The principle according to the specific embodiments may advantageously reduce the number of schedules to be calculated. In particular, the principle according to the specific embodiments may ensure that the requirements of Industrial Ethernet systems are met in all phases and coexisting services may simultaneously use the remaining bandwidth of TSN network 200. Even if the above reservation of resources is related to the time domains by way of example within the scope of IEEE 802.1Qbv, the principle according to the specific embodiments may be comparably applied to other forms of the reservation of resources (e.g., in the frequency domain).

What is claimed is:

1. A method for operating a communication system, which includes a plurality of communication devices and a plurality of time sensitive network (TSN) switches, the method comprising the following steps:
    ascertaining, by a controller, respective operating parameters of respective ones of the plurality of communication devices, which are each configured to transfer data via the communication system, the operating parameters being associated with at least one respective operating phase of the plurality of communication devices; and
    for each respective one of the TSN switches:
        ascertaining, by the controller and based on the ascertained operating parameters, a respective schedule of use of the respective TSN switch by different ones of the plurality of communication devices; and
        transferring, by the controller, the respective schedule to the respective TSN switch;
    wherein the transferring of the respective schedules provides the communication devices with respective periods of uncontested use of the TSN switches, without providing, for other resources of the communication system, periods of uncontested use of the other resources by the communication devices.

2. The method as recited in claim 1, wherein the operating parameters include at least one data structure and/or a cycle time.

3. The method as recited in claim 1, wherein the periods of uncontested use of the TSN switches are provided by at least temporarily establishing:
    a) respective exclusive uses of the respective TSN switches for transferring the data; and/or
    b) respective prioritized uses of the respective TSN switches for transferring the data.

4. The method as recited in claim 1, further comprising:
    transferring the data from at least one of the communication devices via at least one of the TSN switches during one or more of the periods scheduled for the at least one of the TSN switches.

5. The method as recited in claim 4, wherein the data include at least one data packet marked by the at least one of the communication devices with a reference to the schedule, the marking being evaluated by the at least one of the TSN switches for temporary settings of ports of the at least one of the TSN switches during the periods according to the schedules obtained by the at least one of the TSN switches from the marking.

6. The method as recited in claim 1, wherein the method is used for configuring the communication system.

7. A method for operating a time sensitive network (TSN) communication system, which includes at least one TSN communication device, the TSN communication device including a TSN switch, the method comprising the following steps:
    ascertaining operating parameters for at least one further communication device, which is configured to transfer first data via the TSN communication system, the operating parameters being associated with at least one operating phase of the at least one further communication device;
    ascertaining a schedule for the at least one TSN communication device; and
    transferring the schedule to the at least one TSN communication device;
    wherein the at least one further communication device includes multiple different operating phases, individual operating parameters being assigned to each of at least two of the multiple different operating phases, the different operating phases including at least one of the following elements: an identification phase, a configuration phase, and a real-time operating phase.

8. The method as recited in claim 7, wherein the at least one further communication device includes multiple further communication devices configured to transfer the first data via the TSN communication system.

9. A controller for operating a communication system, which includes a plurality of communication devices and a plurality of time sensitive network (TSN) switches, the controller comprising a processor, the processor being configured to:
- ascertain respective operating parameters of respective ones of the plurality of communication devices, which are each configured to transfer data via the communication system, the operating parameters being associated with at least one respective operating phase of the plurality of communication devices; and
- for each respective one of the TSN switches:
  - ascertain, based on the ascertained operating parameters, a respective schedule of use of the respective TSN switch by different ones of the plurality of communication devices; and
  - transfer the respective schedule to the respective TSN switch;
- wherein the transfer of the respective schedules provides the communication devices with respective periods of uncontested use of the TSN switches, without providing, for other resources of the communication system, periods of uncontested use of the other resources by the communication devices.

10. The controller as recited in claim 9, wherein the operating parameters include at least one data structure and/or a cycle time.

11. The controller as recited in claim 9, wherein the controller is used in a motor vehicle and/or in a piece of industrial manufacturing equipment.

12. A communication system, comprising:
- a plurality of time sensitive network (TSN) switches;
- a plurality of communication devices that are configured to transfer data via the communication system; and
- a controller, wherein the controller is configured to:
  - ascertain respective operating parameters of respective ones of the plurality of communication devices, the operating parameters being associated with at least one respective operating phase of the plurality of communication devices; and
  - for each respective one of the TSN switches:
    - ascertain, based on the ascertained operating parameters, a respective schedule of use of the respective TSN switch by different ones of the plurality of communication devices; and
    - transfer the respective schedule to the respective TSN switch;
- wherein the transfer of the respective schedules provides the communication devices with respective periods of uncontested use of the TSN switches, without providing, for other resources of the communication system, periods of uncontested use of the other resources by the communication devices.

* * * * *